United States Patent [19]
Rogers

[11] 3,860,350
[45] Jan. 14, 1975

[54] EXTENSIBLE ARM STRUCTURE
[75] Inventor: Gerald L. Rogers, St. Louis, Mo.
[73] Assignee: Chemetron Corporation, Chicago, Ill.
[22] Filed: June 15, 1973
[21] Appl. No.: 370,436

[52] U.S. Cl................ 403/104, 403/112, 403/377
[51] Int. Cl............................................. F16b 7/14
[58] Field of Search ........... 403/104, 109, 112, 377; 248/188.5, 188.8, 298, 333; 211/105.3

[56] References Cited
UNITED STATES PATENTS
3,265,346  8/1966  Petrick............................... 403/104
3,776,500  12/1973  Foderaro............................ 248/333

FOREIGN PATENTS OR APPLICATIONS
1,054,667  1/1967  Great Britain...................... 248/333
1,403,900  5/1965  France................................ 403/104

Primary Examiner—Jordan Franklin
Assistant Examiner—Conrad L. Berman

[57] ABSTRACT

This extensible arm structure includes a plurality of telescoping members formed from lengths of square section tubing. Each member includes a pair of T-shaped plastic bearing strips at one end, interwoven between longitudinally spaced apertures in the sidewalls and slidingly engageable with the sidewalls of an adjacent member. The bearing strips of one member are engageable with the bearing strips of an adjacent member to preclude separation of the members when the arm is in the extended position.

9 Claims, 12 Drawing Figures

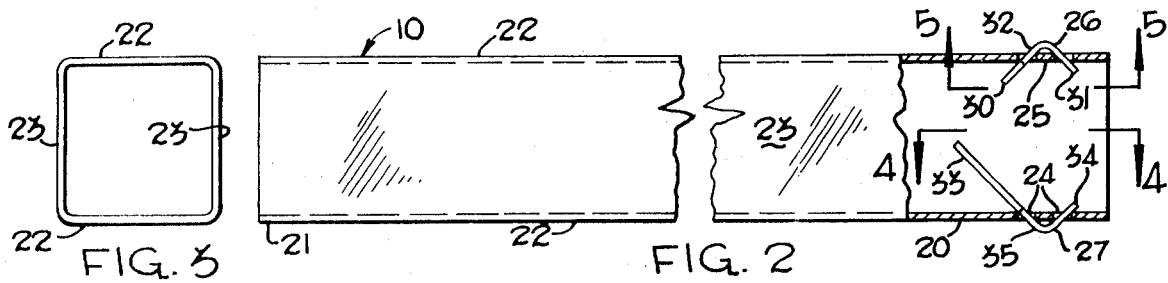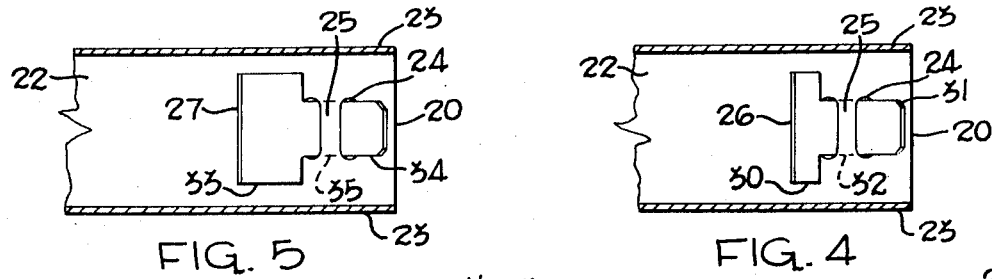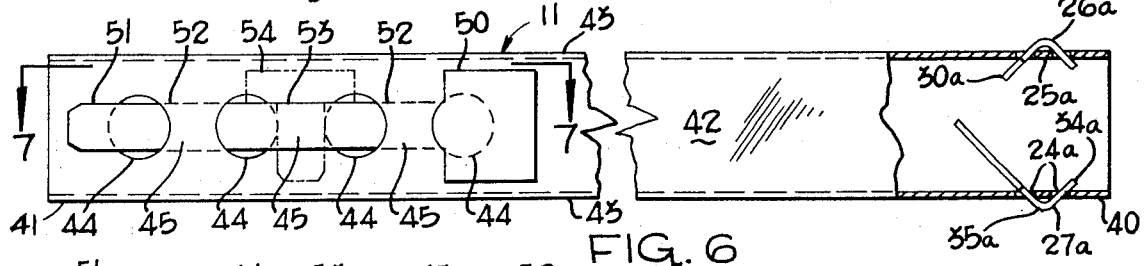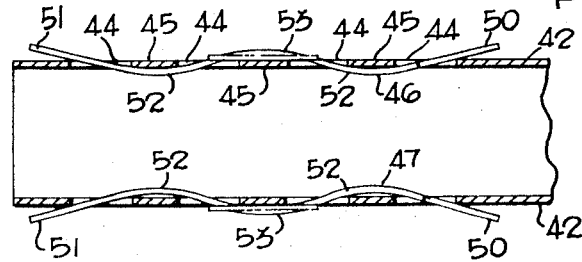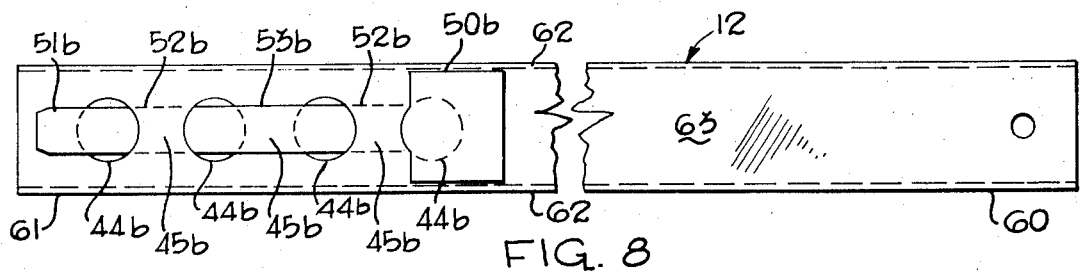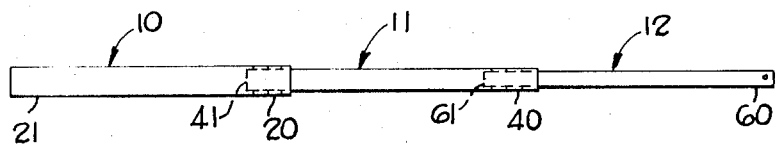

3,860,350

EXTENSIBLE ARM STRUCTURE

BACKGROUND OF THE INVENTION

This invention relates generally to an extensible arm structure and particularly to a telescopic arm structure having improved bearing means between the telescoping members.

Extensible arms consisting of a plurality of telescopically related tubular members have been known for many years. Such arms find particular use for holding lamps and tools, for example, which require an arm of variable length for efficient operation and which are sufficiently compact when retracted as to require only a small storage area.

It is obviously desirable to provide telescopic members that are strong and that also slide easily, one within the other. Unfortunately, these two qualities are rarely found in combination in arms of the type under consideration except in the most expensive structures. The reason for this is that although metal arms are preferred for strength, they require special bearings to provide adequate sliding capability. Plastic arms on the other hand, although providing superior sliding capability are insufficiently strong for most purposes.

Another desirable quality is that the members should be reasonably tight fitting without sacrificing the sliding capability. Independently sprung bearings are preferred for sliding arm structures because of the undesirability of loose fitting parts. However, this form of structure is expensive to manufacture using known methods.

The present device overcomes these and other deficiencies.

SUMMARY OF THE INVENTION

This extensible arm structure can be conveniently manufactured from commercially available lengths of strong metal tubing of conventional size yet provides a smooth telescopic action by means of plastic bearing elements.

The bearing elements are provided by resilient plastic strips which are interwovenly attached to the sidewalls of telescopically related tubular members without the need for fasteners. In addition to providing smooth sliding action said bearing strips also provide stop means precluding separation of the individual arm members in the extended condition. The bearing strips are substantially T-shaped and are thereby self-retained relative to the sidewalls which carry them.

The bearing strips are disposed between the sidewalls of adjacent tubular members and the inherent resilience of the strips obviates looseness between said tubular members.

Corresponding bearing strips of succeeding telescopic members are disposed in alternately opposite sidewalls to avoid interference with each other and permit installation of the strips prior to assembly of the arm as a whole.

This extensible arm structure is relatively simple and inexpensive to manufacture and assemble and is formed from readily available tubing and a small number of simple plastic inserts.

It is an important object of this invention to provide an extensible arm structure comprising a first tubular member including sidewall means having longitudinally spaced apertures disposed therein for accommodating oppositely disposed resilient bearing elements, which extend inwardly of the sidewall means; and to provide a second tubular member including sidewall means having longitudinally spaced apertures accommodating opposed resilient bearing elements extending outwardly of said sidewall means, the bearing elements on each tubular member being slidingly engageable with the other tubular member.

It is another object to provide first and second bearing elements having engagement portions engageable in the extended arm condition to provide stop means precluding separation of the tubular members.

It is another object to provide bearing elements formed from T-shaped plastic strips the head of the tee providing retaining means for the attachment of the strips to the associated sidewalls and also providing the interengagement means precluding separation of said members.

It is an object to provide the receiving tubular member with a pair of opposed bearing strips, one of which is provided with a head longer than the other, to facilitate insertion of said bearing strips between the telescopically related tubular members.

Another object is to provide the received tubular member with a pair of opposed bearing strips having sufficiently long body portions, interwoven with the associated sidewall, to provide intermediate as well as end points of bearing engagement with the receiving tubular member.

It is an object of the invention to provide an extension arm having at least three tubular members, the intermediate member being provided with bearing strips at each end, accommodated within different pairs of sidewalls, and to provide bearing strips on the tubular members on either side of said intermediate member, which are aligned with one set of intermediate member bearing strips but not with the other set of intermediate member bearing strips to facilitate installation of the bearing strips within associated tubular members prior to the assembly of the tubular members.

BRIEF DESCRIPTION OF THE DRAWINGS:

FIG. 1 is a schematic view of the extension arm in the extended position;

FIG. 2 is a fragmentary elevational view of the outer tubular member partly in cross section;

FIG. 3 is a representative end view of an outer tubular member;

FIG. 4 is a cross sectional view taken on line 4—4 of FIG. 2;

FIG. 5 is a cross sectional view taken on line 5—5 of FIG. 2;

FIG. 6 is a fragmentary plan view of the intermediate tubular member, partly in cross section;

FIG. 7 is a cross sectional view taken on line 7—7 of FIG. 6;

FIG. 8 is a fragmentary elevational view of the inner tubular member partly in cross section;

Figure 9:
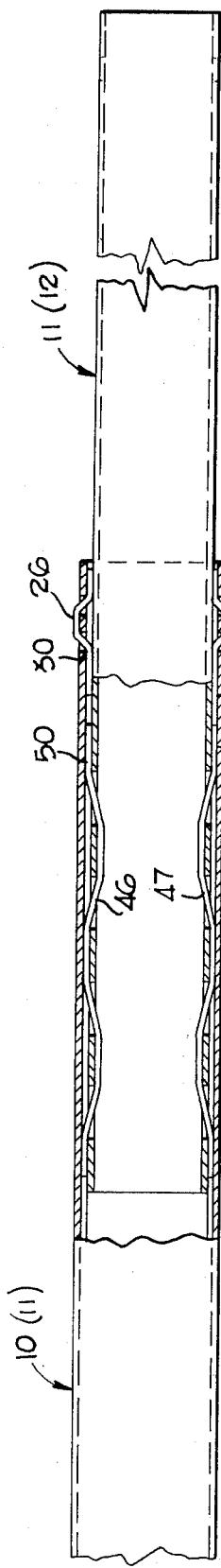
FIG. 9 is a fragmentary elevational view of the outer and intermediate tubular members, partly in cross section, in the assembled, extended condition.

DESCRIPTION OF THE PREFERRED EMBODIMENT:

Referring now by characters of reference to the drawing and first to FIG. 1 it will be understood that the extensible arm is telescopic in nature and includes an outer tubular member 10, an intermediate tubular member 11 and an inner tubular member 12 all of substantially square cross section as shown generally in FIG. 3. In the preferred embodiment these members are of metal and two or more members can be used, the number being limited only by the strength of the individual members. A three member arm is illustrated by way of example.

Figure 12:
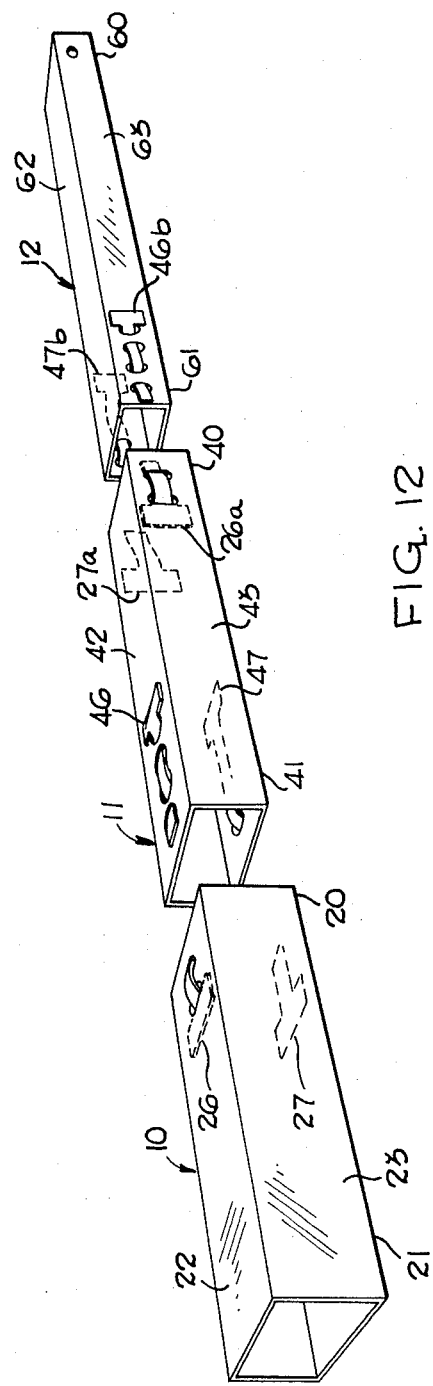
FIG. 12 is a schematic, exploded perspective view of the extensible arm.

As shown in the schematic, exploded perspective view, FIG. 12, each tubular member receiving a smaller tubular member in telescopic relation includes a set of bearing elements at its right hand end to provide a suitable inside bearing surface slidingly engageable with the outside surface of the received smaller tubular member. The smaller tubular member is provided with an associated set of bearing elements at its left hand end to provide a suitable outside bearing surface slidingly engageable with the inside surface of the larger tube. It will be understood that when more than two members are used the intermediate members include a set of bearing elements at both ends.

The specific construction of the telescopically related members, which make up the extensible arm, will now be considered. This relationship is believed best understood by reference initially to tubular members 10 and 11 only, FIGS. 2–7. Member 10, which constitutes a first tubular member, includes a remote right hand end 20 and a proximal left hand end 21 and is defined by a pair of opposed sidewalls 22 and a pair of opposed sidewalls 23. Sidewalls 22, which constitute sidewall means, each include a pair of longitudinally spaced first apertures 24 at the right hand end 20, which are separated by a sidewall portion 25. Received within opposed pairs of apertures 24, in interwoven relation with the sidewall portion 25 are associated, substantially T-shaped resilient plastic strips 26 and 27 of nylon or similar material. Strips 26 and 27 are clearly shown in FIGS. 4 and 5, and constitute first bearing elements. The upper strip 26 includes opposed ends 30 and 31 and an intermediate portion 32 disposed between said ends. The enlarged end 30 acts to retain the associated bearing strip within the apertures 24. The lower bearing strip 27 is similar to the upper bearing strip 26 except that the enlarged head 33 extends a greater distance longitudinally of the tubular member 10 than does the enlarged head 30.

The details of the tubular member 11 are shown with particularity in FIGS. 5 and 6. The tubular member 11, which constitutes a second tubular member, includes a remote, right hand end 40 and a proximal left hand end 41, and is defined by a pair of opposed sidewalls 42 and a pair of opposed sidewalls 43. Sidewalls 43, which constitute sidewall means, include a pair of longitudinally spaced second apertures 44 at the left hand end, which are separated by sidewall portions 45. Received within said apertures 44, in interwoven relation with the sidewall portions 45 are associated, substantially T-shaped resilient strips of nylon or similar material, and strips 46 and 47 constitute second bearing elements. The interwoven relationship is clearly shown in FIG. 7. Distinguishing from upper and lower strips 26 and 27, the upper and lower strips 46 and 47 are of substantially the same length as each other. Each strip includes opposed ends 50 and 51 and intermediate portions 52 and 53 disposed between said ends. The enlarged end 50 acts to retain the associated bearing strip within apertures 44. The ends 50 and 51 and the intermediate portion 53 extend outwardly of the sidewall 43 to provide, in effect three points of bearing support between tubular members 10 and 11. In order to provide an effective intermediate point of support it is desirable, in some instances to provide a T-shaped element, shown in phantom outline by numeral 54, which is placed between the sidewall 42 and the intermediate portion 53 and serves to space said portion away from said sidewall.

Figure 10:
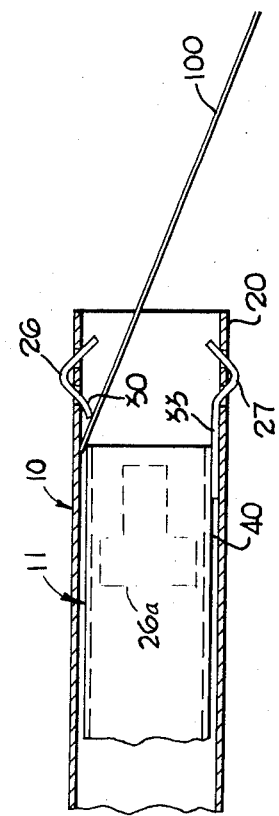
FIG. 10 is a fragmentary elevational view of the outer and intermediate tubular members, partly in cross section, illustrating one stage of the assembly procedure.
Figure 11:
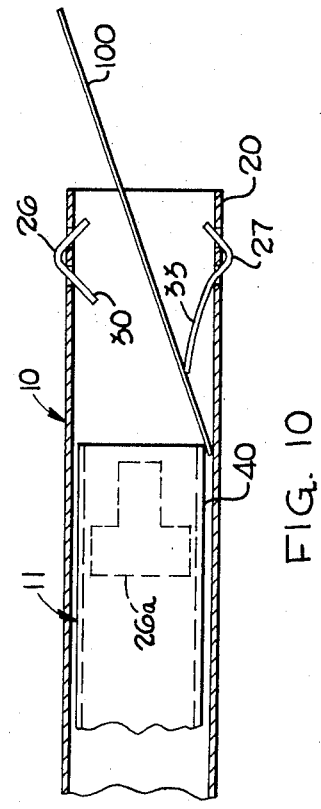
FIG. 11 is a similar view to FIG. 10 illustrating a later stage of the assembly procedure.

The structural relationship of parts between members 10 and 11 is best understood by reference to FIGS. 9, 10 and 11, which will now be discussed.

The bearing strips 26 and 27 provide substantially frictionless bearing faces and each is adapted to receive the tubular member 11 in sliding relation. Because of the initial disposition of the strips 26 and 27 the ends incline inwardly of the sidewalls 22. Because of this, as shown in FIGS. 10 and 11, the enlarged ends 30 and 33 interrupt the path of the tubular member 11, which is inserted from the left hand end 21 of the larger tubular member 10. In order to receive the right hand end 40 of the tubular member 11 in sliding relation the enlarged ends 30 and 33 must be properly positioned. It will be clear from FIG. 10 that the ends 30 and 33 are out of vertical alignment. This structural arrangement of parts facilitates the telescoping of one tubular member inside another. As shown in FIG. 10 the end 33 is first depressed by means of a thin, spring steel member, indicated by numeral 100, so that the tubular member 11 can be slid over it as shown in FIG. 11. The enlarged end 30 can then be depressed as also shown in FIG. 11 so that the member 11 can be slid over it and pushed through the tubular member 10 to the position shown in FIGS. 1 and 9.

The bearing strips 46 and 47 of tubular member 11 are longitudinally aligned respectively with the resilient strips 26 and 27 of tubular member 10 as shown in FIG. 12. Strips 46 and 47 provide substantially frictionless bearing faces and each is adapted to be received by the tubular member 10 in sliding relation.

It is a simple matter to depress the enlarged retaining ends 50 toward the sidewalls 42 for insertion of the left hand end of the tubular member 11 within the left hand end of the tubular member 10. When the tubular members 10 and 11 are substantially the same length this can be done before the engagement of the right hand end 40 of the tubular member 11 with the bearing strips 26 and 27. FIG. 9, which illustrates the relative disposition of tubular members 10 and 11 in the extended position, clearly shows that the enlarged end 50 of bearing strip 47 engages the enlarged end 33 of the bearing strip 27 to provide to stop precluding further outward extension of the tubular member 11 relative to the tubular member 10 and thereby precluding separation of said members in the fully extended position.

It is thought that the structural features and functional advantages of this entensible arm have become fully apparent from the foregoing description of parts but for completeness of disclosure the installation of the sections will be briefly described with reference to a three section extensible arm structure.

The third tubular member 12 is telescopically received within the second member 11 and is structurally related to said second member in substantially the same way as the second member 11 is related to the first member 10. For convenience, corresponding parts of the first tubular member 10, which are the same as those used for the second tubular member 11 are given the same reference numeral with the addition of the suffix *a*. Corresponding parts of the second tubular member 11, which are the same as those used for the third tubular member are given the suffix *b*.

As best shown in FIG. 12, and referring also to FIG. 6, bearing strips 26a and 27a are provided at the right hand end 40 of tubular member 11, which correspond with bearing strips 26 and 27 respectively at the right hand end 20 of tubular member 10, except that bearing strips 26a and 27a are disposed in alternately opposite sidewalls 43, which are 90° out of phase with sidewalls 22 carrying strips 26 and 27 to avoid interference with said strips 26 and 27 during assembly. Similarly, and with reference to FIG. 8 bearing strips 46b and 47b are provided at the left hand end 61 of tubular member 12, which correspond with bearing strips 46 and 47 respectively at the left hand end 41 of tubular member 11, except that bearing strips 46b and 47b are disposed in alternately opposite sidewalls 63, which are 90° out of phase with sidewalls 42 carrying strips 46 and 47, to avoid interference with said strips 46 and 47.

The structural arrangement of parts shown in the schematic representation of FIG. 12 permits all of the bearing strips to be installed prior to the assembly of the telescopic tubular members 10, 11 and 12 and illustrates the advantage of disposing corresponding sets of said strips on non-aligned sides of said tubular members. Once the strips have been installed it is a simple matter to insert the right hand end 60 of the tubular member 12 within the left hand end 41 of the tubular member 11 and urge said member to the right until the end 60 engages element 27a. When this engagement occurs strips 27a and 26a are depressed in turn by means of spring strip 100 so that the tubular member 12 can continue to move to the right until the ends 40 and 60 are substantially aligned. The combined tubular members 11 and 12 can then be inserted within the tubular member 10 until the end 40 engages the strip 27. When this engagement occurs bearing strips 27 and 26 are depressed in turn by means of the spring strip 100 so that tubular members 11 and 12 can continue to move to the right, and ends 20, 40 and 60 can be aligned so that the corresponding members 10, 11 and 12 are fully telescoped in a retracted position. When it is desired to extend the arm, member 12 is pulled to the right until element 47b engages strip 27, which precludes further relative longitudinal movement between tubular members 11 and 12 and therefore precludes separation of said members. Members 11 and 12 can be pulled together out from member 10 until strip 47 engages strip 27 and further outward movement of the assembly is precluded. The members are returned to the retracted position by simply pushing member 12 into member 11 and pushing members 11 and 12 together into member 10.

It will be understood that when, for example, member 12 is pushed into member 11 it will be necessary to depress the enlarged ends of strips 46b and 47b so that they are easily received within tubular member 11.

I claim as my invention:

1. An extensible arm structure comprising:
a. a first tubular member including first sidewall means at one end,
b. a first resilient bearing element attached to and extending inwardly of said first sidewall means,
c. a second tubular member telescopically received by said first tubular member through its said one end and movable to an extended arm position, said second tubular member including second sidewall means at one end that is maintained within the first tubular member in the extended arm position,
d. a second resilient bearing element attached to and extending outwardly of said second sidewall means,
e. said first bearing element being slidingly engageable with said second tubular member, and said second bearing element being slidingly engageable with said first tubular member,
f. the first and second tubular members including means for maintaining the first and second bearing elements in longitudinal axial alignment,
g. the first and second bearing elements including portions engaging in the extended arm position and precluding separation of the first and second tubular members.

2. An extensible arm structure comprising:
a. a first tubular member including sidewall means having opposed ends, one end having longitudinally spaced first apertures disposed therein,
b. a first resilient bearing element received by and extending between said first apertures, said first element having an end portion extending inwardly of said sidewall means,
c. a second tubular member received within said first tubular member through its said one end in telescopic relation and movable to an extended arm position, said second tubular member including sidewall means having opposed ends, one end that is maintained within the first tubular member in the extended position having longitudinally spaced second apertures disposed therein,
d. a second resilient bearing element received by and extending between said second apertures, said second element having an end portion extending outwardly of said second sidewall means,
e. the end portion of the first bearing element being slidingly engageable with the second tubular member, and the end portion of the second bearing element being slidingly engageable with the first tubular member,
f. the first and second tubular members including means for maintaining the end portions of the bearing elements in longitudinal axial alignment, and
g. said end portions being engageable in the extended arm position to preclude separation of said first and second tubular members.

3. An extensible arm structure as defined in claim 2, in which:
a. said first resilient bearing element is a plastic strip having opposite end portions extending inwardly of the sidewall means of the first tubular member, the end portions slidingly engaging in bearing relation the sidewall means of the second tubular member and holding the strip in the spaced first apertures, and
b. said second resilient bearing element is a plastic strip having opposite end portions extending outwardly of the sidewall means of the second tubular member, the end portions slidingly engaging in bearing relation the sidewall means of the first tubular member and holding the strip in the spaced second apertures.

4. An extensible arm structure comprising:
   a. a first tubular member including opposed sidewall means having opposed ends, the same end of each sidewall means having longitudinally spaced first apertures disposed therein separated by a sidewall portion,
   b. a pair of first resilient bearing elements, each received by associated spaced first apertures in interwoven relation with the associated sidewall portion, each element including opposed inwardly extending end portions and an outwardly extending intermediate portion,
   c. a second tubular member, received within said first tubular member in telescopic relation and movable to an extended arm position, said second tubular member including opposed sidewall means having opposed ends, the same end of each sidewall means having longitudinally spaced second apertures disposed therein separated by a sidewall portion,
   d. a pair of second resilient bearing elements, each received by associated spaced second apertures in interwoven relation with the associated sidewall portion, each element including opposed outwardly extending end portions,
   e. said end portions of the first bearing elements being slidingly engageable with the second tubular member, and said end portions of the second bearing elements being slidingly engageable with the first tubular member, and
   f. one of the end portions of one of the first pair of bearing elements being engageable with an associated end portion of one of the second pair of elements in the extended arm position to provide stop means precluding separation of said first and second tubular members.

5. An extensible arm structure as defined in claim 4, in which:
   a. each first resilient element includes a retaining head portion at one end,
   b. each second resilient element includes a retaining head portion at one end, and
   c. one of said head portions of the first pair of elements is engageable with one of said head portions of the second pair of elements to provide said stop means.

6. An extensible arm structure as defined in claim 5, in which:
   a. one of the head portions of the first pair of elements is longer than the other of the head portions of the first pair of elements to facilitate insertion of said elements between the telescopically related tubular members.

7. An extensible arm structure as defined in claim 5, in which:
   a. each element of the second pair of resilient elements includes an outwardly extending intermediate portion which cooperates with said outwardly extending end portions to provide three points of sliding engagement on each second element between said first and second tubular members.

8. An extensible arm structure comprising:
   a. A substantially sqquare first tubular member including two pairs of opposed sidewalls, each of one pair of opposed sidewalls having a plurality of longitudinally spaced first apertures at one end.
   b. a pair of first resilient plastic bearing strips, each received by associated first apertures in interwoven relation with the associated sidewall, each strip including inwardly extending end bearing portions, one of said end portions providing a retaining head,
   c. a substantially square second tubular member received within said first tubular member in telescopic relation and including two pairs of opposed sidewalls, each of one pair of opposed sidewalls having a plurality of longitudinally spaced second apertures at one end, and each of the other pair of opposed sidewalls having a plurality of longitudinally spaced second apertures at the other end.
   d. a pair of second resilient plastic bearing strips, each received by associated spaced apertures in interwoven relation with the associated sidewall at one end of said second tubular member, each strip including outwardly extending end bearing portions, one of said end portions providing a retaining head,
   e. another pair of second resilient plastic bearing strips, each received by associated spaced apertures in interwoven relation with the associated sidewall at the other end of said second tubular member, each strip including inwardly extending end bearing portions, one of said end portions providing a retaining head,
   f. a substantially square third tubular member received within said second tubular member in telescopic relation and including two pairs of opposed sidewalls, each of one pair of opposed sidewalls having a plurality of longitudinally spaced third apertures at one end,
   g. a pair of third resilient plastic bearing strips, each received by associated third apertures in interwoven relation with the associated sidewall, each strip including outwardly extending end bearing portions, one of said end portions providing a retaining head, and
   h. the first bearing strips being slidingly engageable with the second tubular member and being substantially longitudinally aligned with the associated second bearing strips at said one end of said second tubular member, the second bearing strips at said one end of the second tubular member being slidingly engageable with the first tubular member, the second bearing strips at said other end of the second tubular member being slidingly engageable with the third tubular member, the third bearing strips being slidingly engageable with the second tubular member and being substantially longitudinally aligned with the associated second bearing strips at said other end of said second tubular member.

9. An extensible arm structure as defined in claim 8, in which:
   a. at least one of the retaining heads of the first pair of bearing strips provides an engagement portion and at least one of the retaining heads of the second pair of bearing strips, aligned with said first pair of bearing strips provides an engagement portion, said engagement portions being engageable to preclude separation of said first and second tubular members, and b. at least one of the retaining heads of the third pair of bearing strips provides an engagement portion and at least one of the retaining heads of the second pair of bearing strips, aligned with said first pair of bearing strips, provides an engagement portion, said engagement portions being engageable to preclude separation of said second and third tubular members.

* * * * *